United States Patent [19]

Kelley

[11] 4,176,054
[45] Nov. 27, 1979

[54] WASTE PAPER RECYCLING

[76] Inventor: Joseph A. Kelley, 65 W. Jackson Blvd., Chicago, Ill. 60604

[21] Appl. No.: 796,897

[22] Filed: May 16, 1977

[51] Int. Cl.$^2$ .............................................. B03C 1/00
[52] U.S. Cl. .......................................... 209/8; 209/47; 209/215
[58] Field of Search ........................ 209/1, 39, 49, 214, 209/213, 215, 47, 9, 8; 241/20, 24, 3; 260/2.3; 210/222, 42, 223; 252/62, 53; 428/900

[56] References Cited

U.S. PATENT DOCUMENTS

| 360,842 | 4/1887 | Atkins | 209/215 X |
| 933,717 | 9/1909 | Lockwood | 209/214 X |
| 1,823,852 | 9/1931 | Brandus | 209/214 X |
| 1,883,559 | 10/1932 | Chipman | 428/900 X |
| 2,232,295 | 2/1941 | Urbain | 209/214 X |
| 2,398,725 | 4/1946 | Schulte | 209/214 X |
| 2,662,639 | 12/1953 | Novak | 209/215 X |
| 2,797,370 | 6/1957 | Bennett | 428/900 X |
| 2,828,010 | 3/1958 | Gomppel | 209/214 X |
| 2,984,122 | 9/1960 | Colburn | 209/214 X |
| 3,023,123 | 2/1962 | Colwill | 428/900 X |
| 3,412,854 | 11/1968 | Klein | 209/39 |
| 3,470,067 | 9/1969 | Warren | 209/215 X |
| 3,613,215 | 10/1971 | Uhl | 29/403 |
| 3,810,890 | 5/1974 | Ruler | 252/62.53 X |
| 3,852,069 | 12/1974 | Paesschen | 252/62.53 X |
| 3,926,789 | 12/1975 | Shubert | 209/214 X |
| 3,929,627 | 12/1975 | Frangiskos | 209/47 X |

Primary Examiner—Robert Halper
Attorney, Agent, or Firm—Mason, Kolehmainen, Rathburn & Wyss

[57] ABSTRACT

A method of waste paper recycling wherein the unwanted portions of waste paper such as those containing a binder adhesive are separated from the remaining paper material. In the binding of books, catalogues, directories, pamphlets, magazines and the like, adhesive material is provided having a magnetic substance therein and in subsequent recycling, the waste paper from these books and magazines is cut into a plurality of relatively small pieces. These pieces are passed through a magnetic field wherein the portions containing the adhesive having magnetic material therein, are separated from the remaining non-magnetically attracted sheets of paper. The process can be carried out wet or dry and the invention also includes a new type adhesive for use in book, magazine, catalogue and pamphlet binding processes wherein a proportion of magnetic or paramagnetic material is integrated with the adhesive material (preferably of the hot melt type commonly used in binding books) so that upon subsequent recycling of the books, etc. as waste paper, the adhesive containing portions of the paper may be magnetically separated from the rest of the waste paper sheets.

20 Claims, No Drawings

WASTE PAPER RECYCLING

BACKGROUND OF THE INVENTION

1. Field of the Invention

The present invention relates to waste paper recycling processes and more particularly relates to a process for separating out portions of the waste paper which contain adhesive material and other contaminants from the remaining portions of the waste paper which are free from such contaminants. In addition, the invention relates to a new and improved adhesive used for binding books, magazines, catalogues, pamphlets and the like, wherein the adhesive aids in subsequent recycling processes because it facilitates separation of the portions of the paper having adhesive thereon from the portions that do not contain any such adhesive contaminants.

2. Description of the Prior Art

One major source of waste paper is books, magazines, catalogues, directories, pamphlets and the like, and many of these items are bound with an adhesive material which is used for binding the sheets together along an edge or back. Waste paper material which contains certain of these adhesive portions is difficult to use in recycling processes and many different methods have been tried for separating and eliminating the portions of the waste paper which contains the adhesive material from the remaining portions of the waste paper which are free of the adhesive used in the book binding process. Waste paper without adhesive material is readily suitable for recycling processes but, when certain adhesive or other contaminants are present, the waste paper is less valuable and more difficult to recycle.

One method that has been used to remove the adhesive material is to mechanically cut or shear the books, pamphlets and the like, along a line closely adjacent the bound edge or back so that only a small strip which contains the adhesive materials can be separated from the remaining portion of the paper sheets or pages which do not contain any adhesive material. This cutting and shearing is at best difficult and requires expensive cutting and handling apparatus to accomplish the necessary separation. Moreover, the books, magazines and other adhesively bound paper items have to be properly orientated when placed in the cutting or shearing apparatus so that excessive amounts of good waste paper material is not thrown away along with the contaminated material having the adhesive thereon. Methods have also been utilized in which it is attempted to chemically dissolve or otherwise assimilate the adhesive used in the binding process so that the contaminant effects are minimized. However, most of the adhesive materials that are widely used are of the hot melt type and very difficult to dissolve or remove chemically. Moreover, the cost of this approach is not economical when constrained by the present difference in price between waste paper that is free of adhesive type contaminant material and waste paper that contains a normal amount of such contaminating adhesive material.

It is therefor an object of the present invention to provide a new and improved method of separating unwanted or contaminated material from waste paper thereby to facilitate recycling of the non-contaminated waste paper remaining after separation.

Still another object of the present invention is to provide a new and improved method of separating adhesive containing portions of books, magazines and other bound paper items from the remaining portion of the paper sheets which are free of any adhesive binding materials.

Yet another object of the present invention is to provide a new and improved system of the character described wherein an adhesive material used in the book binding process is provided with a magnetic or paramagnetic component so that subsequently during a recycling process, the magnetic characteristics of the component may be used to facilitate separation of the portions of the waste paper having adhesive materials thereon from the remaining portions of the waste paper which are free of such adhesive contaminants.

Another object of the present invention is to provide a new and improved adhesive material especially adapted for use in binding books, papers, magazines and the like wherein a magnetic component is included in the adhesive used in the binding process and which component is useful in subsequent recycling processes in accordance with the invention for aiding in separating the portions of the waste paper that have adhesive thereon from the remaining waste paper which is relatively free of adhesive materials.

Yet another object of the present invention is to provide a new and improved method of separating unwanted material from waste paper in books, pamphlets and the like wherein mechanical cutting or shearing of the bound edge portion or back is not required.

Yet another object of the present invention is to provide a new and improved system of recycling waste paper wherein during a book binding type process, an adhesive material with a magnetic component herein is utilized so that subsequently during a recycling process, the magnetic characteristics of the adhesive are available for use in magnetic separation of the portions of the books having adhesive thereon from the remaining portions of the waste paper which is not contaminated with adhesive substance.

Two common means for separating magnetic from non-magnetic materials are provided including a permanent magnet or a magnetic field due to a permanent magnet on one hand or a magnetic field developed by an electromagnet, and this latter type can be a high gradient field or a field of relatively lower magnetic strength.

Yet another object of the present invention is to provide a new and improved method of the character described wherein waste paper material is pulped and mixed with water to form a slurry as is standard in the recycling of waste paper which slurry is then passed through a high intensity or high gradient magnetic separator for separating the waste paper having adhesive thereon from the portions of waste paper which is free of adhesives or is uncontaminated.

Still another object of the present invention is to provide a new and improved method of recycling waste paper material using a high intensity magnetic separation process for eliminating unwanted or contaminated portions from the waste paper that is treated.

SUMMARY OF THE INVENTION

The foregoing and other objects and advantages of the present invention are accomplished in a new and improved method of separating unwanted material from waste paper wherein the waste paper includes a magnetic or paramagnetic material that is normally applied during a book binding process in the adhesive that is used for binding the sheets together, such as in books, magazines, pamphlets, cataloques, directories and the like. Subsequently, waste paper including such books, magazines, etc. is first treated by a cutting process wherein the material is cut of chopped up into a plurality of relatively small pieces. These pieces are then passed or flowed through a magnetic field of a permanent magnet or an electromagnet, and the latter may provide a high intensity magnetic field which is effective to attract toward a collecting medium only those pieces of material which contain some of the adhesive material having the magnetic component therein. The remaining uncontaminated pieces of waste paper may then be further treated in a variety of recycling processes.

The adhesive material which contains the magnetic or paramagnetic component may be a conventional hot melt type adhesive and the magnetic substance may comprise a variety of materials which are ferro magnetic or paramagnetic in nature. The use of high intensity or high gradient magnetic separators has made it possible to effectively utilize magnetic separation on materials which are not highly magnetic and these are generally classed and defined as paramagnetic materials.

A number of high gradient magnetic separators are available and are suitable for use in the present invention. In most of the available separators, a matrix of steel wool, wire grids or other types of collectors formed of magnetic material are provided and a wet slurry or a dry flow of material containing such magnetic or paramagnetic substance to be separated out is passed through the collector which is magnetized to a relatively high gradient or flux density by a surrounding magnet steel core and electromagnetic coils. The slurry passes through the collector and the magnetic material on the contaminated waste paper is attracted and collected while the remaining portions of the slurry or dry mix flows through the separator. This portion is of course, free of magnetic contaminants.

Examples of suitable high intensity magnetic separators are shown in British Patents Nos. 767,124 and 768,451 to G. H. Jones who is one of the pioneers in the developing of high intensity wet magnetic scrubbers. These scrubbers allow the magnetic processing of mineral slurries to remove magnetic contaminants therefrom. A canister type, high gradient magnetic filter is shown in U.S. Pat. No. 2,074,085 to S. G. Frantz, and in this type of magnetic filter, the magnetic or paramagnetic particles are trapped and held until the particles are subsequently washed out after the applied magnetic field is reduced to zero force.

In more recent years, a most successful application of high gradient magnetic separation was achieved with a magnetic separator as shown and described in U.S. Pat. No. 3,471,011 to Iannicelli et al. The aforementioned British and U.S. Patents are incorporated herein by reference and it will be appreciated from the following description that devices of the type shown in these patents can be utilized in practicing the method of the present invention.

In another aspect of the invention, namely, the art of binding books, pamphlets, catalogues, directories, magazines and the like, there is provided a new and improved adhesive binder (preferably of the hot melt type) which adhesive includes a magnetic or paramagnetic material. After the application of the binder and finally when the books, pamphlets, and other bound papers become waste paper, they are readily utilized in waste paper recycling processes and the adhesive containing portions are magnetically separated from the other portions of the paper materials in a high gradient magnetic separating device either in a wet or dry process.

DESCRIPTION OF THE PREFERRED EMBODIMENT

In the binding of paper pages and sheets into books, pamphlets, magazines and the like, many processes utilize various types of adhesives (usually the hot melt type) to aid in securing the pages together along an edge or back of the book or pamphlet, etc. When the books, magazines etc. are finished they are sheared on three sides and these shavings have a portion of them with the hot melt adhesive thereon, which is a contamination downgrading the value of the waste paper resulting. Subsequently, when these books, pamphlets and the like become waste paper, it is desirable to treat them in waste paper recycling processes wherein the paper material can be salvaged for reuse. The presence of hot melt type and some other (not all) adhesive materials along the edge or back of the books, magazines, pamphlets and the like, cause problems in the recycling processes because of these adhesive materials which are not easily removed or separated from the remaining portions of the pages or sheets which do not contain such material. Hot melt type adhesives which are commonly and widely used in binding processes are not generally known to readily dissolve by chemical action and it is difficult to physically remove these portions along the back or edge of a book in mechanical apparatus such as shears, cutters and the like. Accordingly, the price paid for waste paper which is free of such contaminating adhesive materials is considerably higher than that obtainable for waste paper material which contains such adhesives and other contaminants along the bound edge portion or back of the books, pamphlets, and the like.

In recycling waste paper products of the nature described, the material is flailed or beaten into pulp form and water is added to form a slurry of paper fibre pulp similar to a slurry or raw virgin forest products as originally used in making paper on machines, such as a Fourdrinier machine or the like. The presence of little bits of adhesive material in the recycled pulp makes the formation of new paper of good quality extremely difficult or impossible.

In accordance with the invention, a new and improved method is provided for facilitating the removal of these contaminating adhesive materials from books, pamphlets, magazines and the like which become waste paper. This material is normally contained in the paper sheets only along the bound edge or back and is generally a hot melt type adhesive.

The present invention provides a new adhesive for use in book binding processes having a magnetic or paramagnetic component therein in a percentage range of from 3% to 50% by weight. In one example, the magnetic material in the adhesive comprises a mineral known as "magnetite" or "lodestone" which is crushed into fine powder and added to a conventional type of hot melt adhesive in a solid powdered form. The magnetic material is blended into the adhesive while it is in a liquid state and the magnetite and adhesive are thoroughly intermixed before the adhesive material is ready for use in the hot melt application process used in binding books, pamplets, catalogues, directories and the like.

In another example, a powdered ferro magnetic material such as iron or steel in finely divided form are blended and mixed with hot melt adhesive in a range of 3% to 50% by weight. Other paramagnetic materials (i.e. materials which are not magnetic to a high degree) such as stainless steels, various compounds of metals and non-metals such as aluminum, copper, cobalt, platinum and others which are capable of acting as ferrous materials and are attracted to a magnet may also be blended and intermixed with hot melt adhesives which are presently being used in the book binding processes.

The hot melt adhesives are formulated items and may contain rubber polyvinyl alcohol and/or polyvinyl acetate and the adhesives may be formulated with pigments, dyes, fillers and stabilizers, etc. The addition of magnetic and/or paramagnetic materials in the range of 3% to 50% by weight in finely divided or powdered solid form with these adhesives has little deleterious effect on the adhesive properties of the overall mixture, which mixture is employed in the usual or conventional manner in the book binding art.

Subsequently, books, pamphlets, magazines, catalogues, directories and other bound paper items which are made with the adhesive which contains the magnetic or paramagnetic additive in accordance with the invention, eventually become available as waste paper raw material for recycling processes. The waste paper is first treated in a shredder, slicer, cutter or chopper so that the sheets or pages are broken down into discrete particles or strips of limited size. These pieces for example, may have a maximum width or particle or piece size of approximately ¼" or less. After cutting, the pieces may pass over one or more permanent magnets on conveyor(s) containing magnetized rollers(s) or pulley(s). If required, the material may be passed over more than one permanent magnet or multiple passes may be made to effectively remove the magnetic portions of the paper particles in a dry process.

These particles or strips may also be intermixed with water forming a pulp slurry, as in a recycling plant. The paper pieces and strips are broken down by mechanical flailing or beating to produce a better, more homogeneous thin pulp slurry suitable for processing into recycled paper sheets.

The wet or dry waste paper pulp including the discrete particles or pieces of waste paper which contain pieces or particles of the hot melt adhesive thereon may also be passed through a magnetic separator preferably of the high gradient strength type. In the separator, dry material or the wet slurry of pulped waste paper flows through a highly magnetized grid structure and the portions or pieces of waste paper having adhesive bits which contain the magnetic or paramagnetic component are attracted and held by the magnetized collector structure. The remaining non-magnetic material passes through the separator and is substantially free of any contaminating adhesive material or metal objects and is suitable for further process to form recycled paper.

As previously mentioned, various types of high gradient magnetic separators are suitable for use with the process of the present invention and after passage of the pulped waste paper through the collector structure, the collector is then damagnetized and back flushed to remove the contaminants picked up. After flushing, the collector is again remagnetized for further use. The wet or dry waste paper processed through a high gradient magnetic separator as described is usable along with or in combination with other fibres or rag content or cotton for use in the manufacture of white papers, bonds, ledgers or draft papers, paperboard, corrugated box board and the like. In the further process, the addition of aqueous chemical solutions and other ingredients may take place to provide the desired finish on the recycled paper in accordance with known paper maing art.

The present invention thus provides a new and improved hot melt type adhesive having a magnetic component or paramagnetic component therein, which adhesive is especially well adapted to make available as waste paper raw material papers in the forms of bound books, pamphlets, cataloques, directories, magazines and the like, which forms were previously thought to be unusable for the most part in recycling processes because of the prohibitive costs of removing the hot melt adhesives therein. The book binding art in utilizing the new adhesive with a magnetic component therein is not substantially effected and is more attuned to a complete recycling system wherein waste paper in the form of books, pamphlets, catalogues, directories and magazines and the like provide a source of raw material not previously used without substantial economic penalties. The use of the new adhesive binding material having the magnetic or paramagnetic component therein eliminates the need for specialized mechanical shearing, cutting or tearing of the bound back or edge portion of books, pamphlets and the like as a step in recycling processes and also eliminates the need for costly chemical treatment systems used for dissolving the resinous hot melt type adhesives so that this material does not detract from the recycling processes of waste paper. The new adhesive binding method does not detract from treatment of the waste paper to remove coatings, sizing materials, inks, etc. in accordance with known recycling processes.

Magnetic separation in accordance with the invention is available in a wide variety of mechanisms which include both permanent magnet type separators and electromagnetic separating devices. Permanent magnets can be utilized to provide magnetic fields for effecting separation as the material flows along chutes and various types of conveyors. These magnets may be suspended above the flow of material or may be positioned on the bottom of a chute or on or in the vicinity of a belt pulley, a roller, a feeding device trough or table. Electromagnets may be utilized to selectively magnetize a wide variety of collector structures which may be demagnetized at selected intervals for release and flush out of the collected material. The electromagnetic separators may be of the type known as high gradient magnetic separators wherein relatively high strength magnetic fields are provided. These types of separators are extremely effective in separating out materials having a relative low magnetic strength. With materials of relatively high magnetic strength, effective and efficient separation may be achieved without requiring such high levels of gradients of magnetic strength. One manufacturer or magnetic separators suitable for use in accordance with the present invention is the Eriez Magnetics Company of Erie, Penn.

In addition, the use of magnetic and/or paramagnetic materials in a book binding adhesive of the type already available and abundant is economical and provides a great step forward in the conservation of natural resources, a goal toward which the present invention is closely directed. The waste paper treatment can be carried out in both a wet and a dry process and the separation of contaminants that is effected by available high gradient magnetic separators is extremely good. For example, extremely high recovery efficiencies have been achieved when magnetic flux densities in the separators of approximately 20 kilogauss per centimeter are provided.

Although the present invention has been described with reference to a single illustrated embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A method of treating paper comprising the steps of:
   providing a magnetic material in an adhesive substance to form a magnetic adhesive for binding together paper sheets;
   applying said magnetic adhesive to a selected part of said paper sheets for securing said sheets together along a common edge;
   cutting said secured together sheets of paper into a plurality of relatively small pieces so that a first group of said pieces has bits of said magnetic adhesive adhering thereto and a second group of said pieces is free of said magnetic adhesive;
   passing all said pieces through a magnetic field for attraction toward a magnetic collector only those pieces of said first group having said magnetic adhesive adhering thereto; and
   separating the unattracted pieces of said second group of pieces from those magnetically attracted pieces of said first group of pieces.

2. The method of claim 1 including the step of thoroughly intermixing said magnetic material and said adhesive substance prior to the application thereof for binding together said paper sheets.

3. The method of claim 1 wherein said magnetic material includes magnetite.

4. The method of claim 3 wherein said magnetite is added to said adhesive substance in the range of 3% to 50% by weight.

5. The method of claim 1 wherein said magnetic material comprises a ferro magnetic substance.

6. The method of claim 1 wherein said magnetic field is provided with a high gradient for high intensity magnetic separation.

7. The method of claim 6 wherein said magnetic material comprises a paramagnetic material of relatively low magnetic strength.

8. The method of claim 1 including the step of pulping all of said pieces of paper in water and flowing a mixture of paper pulp and water throuh said magnetic field.

9. The method of claim 1 wherein said magnetic field is developed by a permanent magnet.

10. The method of claim 1 wherein said magnetic field is developed by an electromagnet.

11. The method of claim 1 wherein said adhesive substance comprises a hot melt type adhesive.

12. The method of claim 1 wherein said magnetic material comprises finely divided particles dispersed through said adhesive substance.

13. A method of treating paper comprising the steps of:
   providing a magnetic material in an adhesive substance to form a magnetic adhesive for binding together paper sheets;
   applying said magnetic adhesive to a selected part of said paper sheets for securing said sheets together along a common edge;
   chopping said secured together paper sheets into a plurality of discrete small pieces of paper with some of said pieces of paper having bits of said magnetic adhesive adhering thereto and other pieces of paper free of said magnetic adhesive;
   pulping all of said discrete pieces of paper to form a pulp of discrete pieces of paper in a water slurry;
   passing said pulp through a magnetic field for attracting only those discrete pieces of paper in said pulp that have said magnetic adhesive adhering thereon; and
   separating the magnetically unattracted pieces of paper in said pulp from those pieces that have been magnetically attracted in said field.

14. The method of claim 13 wherein said pulping step includes beating said discrete pieces of paper in said water slurry.

15. The method of claim 13 wherein said magnetic material is paramagnetic.

16. The method of claim 13 wherein said magnetic material has a relatively low magnetic strength.

17. The method of claim 13 wherein said magnetic material is intermixed with said adhesive substance before application to secure said sheets of paper together.

18. The method of claim 13 wherein said magnetic field is effective to physically remove portions of those pieces of paper having magnetic adhesive thereon from attached portions having no magnetic adhesive thereon in said slurry.

19. The method of claim 13 wherein said magnetic field is formed by a permanent magnet.

20. The method of claim 13 wherein said magnetic field is formed by an electromagnet.

* * * * *